Dec. 16, 1952  E. A. WHITLOCK  2,622,065
LIQUID AND GAS FEEDING
Filed June 24, 1947  3 Sheets-Sheet 1
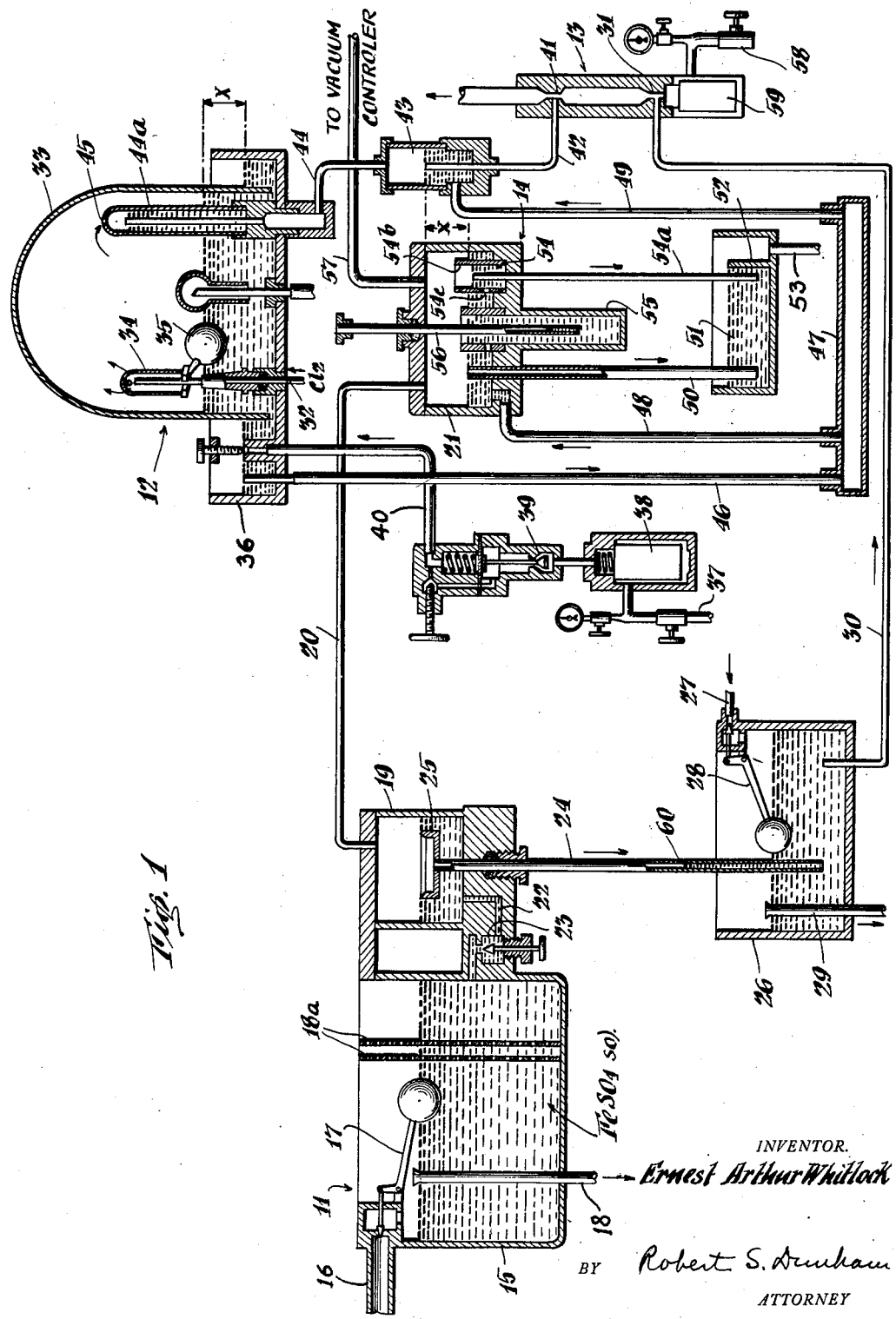
INVENTOR.
*Ernest Arthur Whitlock*
BY *Robert S. Dunham*
ATTORNEY

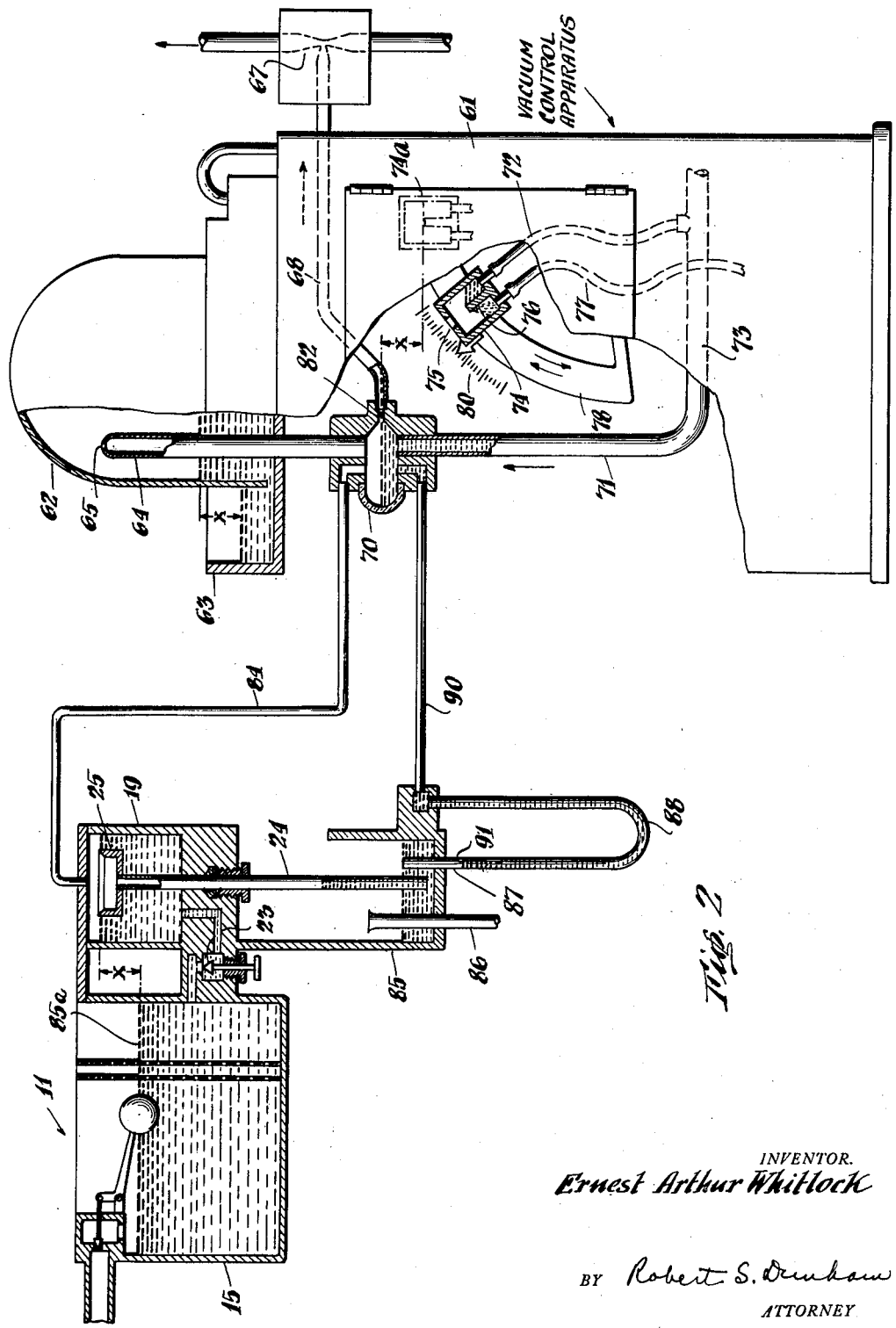

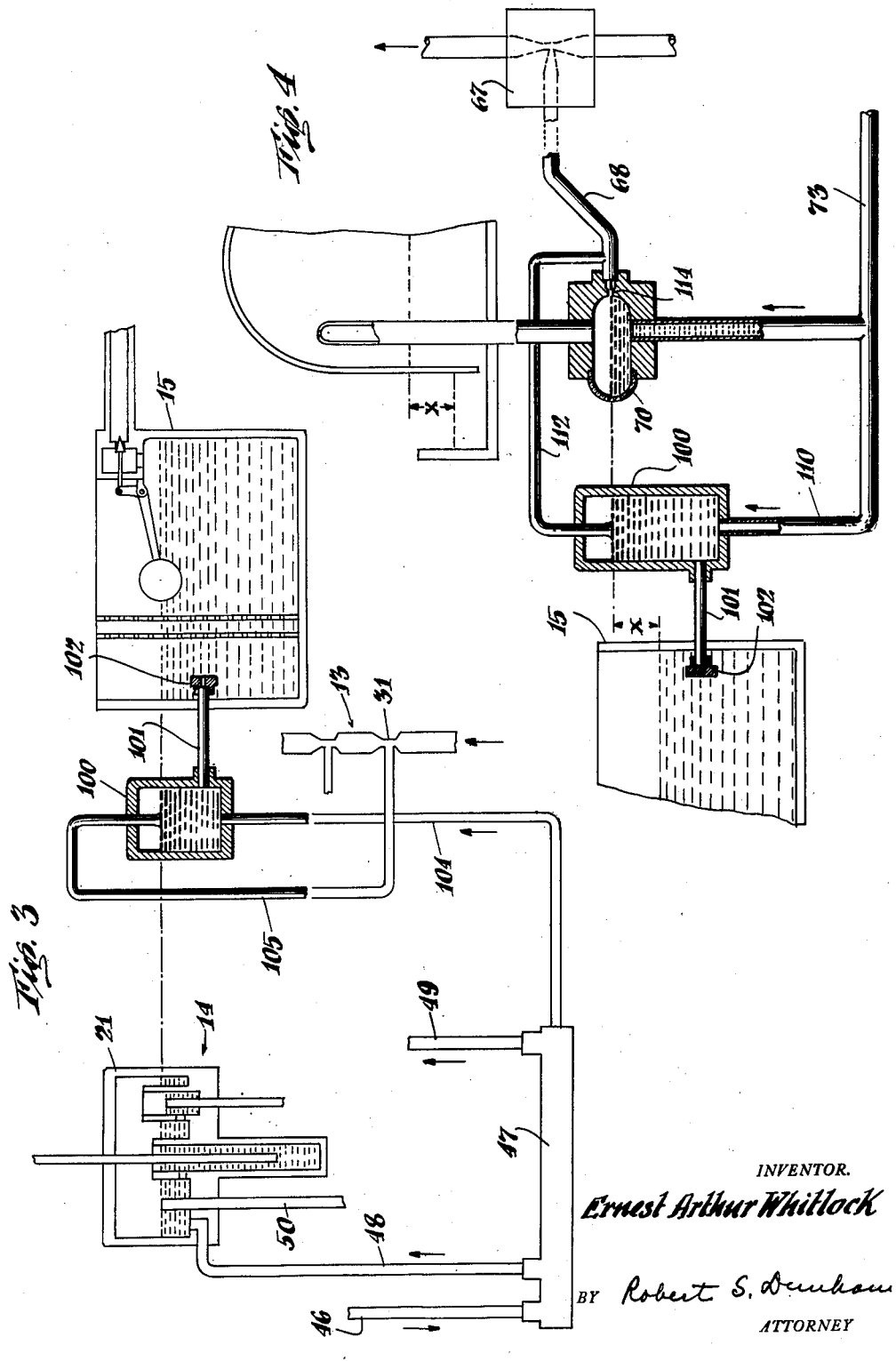

Patented Dec. 16, 1952

2,622,065

UNITED STATES PATENT OFFICE 2,622,065

LIQUID AND GAS FEEDING

Ernest Arthur Whitlock, London, England, assignor to Wallace & Tiernan Limited, London, England, a corporation of Great Britain Application June 24, 1947, Serial No. 756,647
In Great Britain July 1, 1946

13 Claims. (Cl. 210—28)

1

This invention relates to apparatus and procedure for feeding fluids at predetermined rates and in an important specific aspect relates to the feeding of a liquid in a desired, controllable manner to a locality of use such as a large body of liquid, and particularly in desired proportion to the simultaneous feed of another fluid, e. g. a gas, to be mixed with the liquid that is fed. An important object of the invention is to provide improved methods and procedure for such purposes, especially apparatus of simple and reliable character affording an accurate and readily adjustable feed. A further object is to provide improved arrangements whereby a gas may be fed to a locality of use under the control of an adjustable pressure, specifically a vacuum or so-called negative pressure, and wherein for mixture with the gas, a liquid is simultaneously fed at a rate controlled by the same vacuum-control instrumentalities so as to maintain substantially a desired proportion between the liquid and gas.

Whereas apparatus and procedure of the character stated may find use in a variety of industrial and like operations, as where it is desirable to deliver a plurality of chemical agents into a liquid in fixed proportions and at a rate dependent upon variable circumstances or conditions, a notably significant aspect of the invention has to do with improvements in the production of chlorinated copperas solution, as may be used in the treatment of water or other aqueous liquids to promote settling. For example the settling processes in the treatment of sewage can be desirably accelerated by the addition of chlorinated copperas solution, it being understood that the ferric salt present in the latter brings about a chemical precipitation of the solid particles present in the sewage and thus considerably reduces the time taken up by the settling process.

Chlorinated copperas may be made by the mutual treatment of chlorine and ferrous sulfate in aqueous conditions, and it is ordinarily necessary that this treatment be effected in situ, e. g by mixing the constituents in the vicinity of the sewage processing or other operation, and then feeding the reacted mixture promptly to the sewage. In so doing it is uneconomical to add more chlorine than is necessary to oxidize the ferrous sulfate, and furthermore, because of considerable changes in the volume and character of the sewage flow, it is uneconomical to supply the chlorinated copperas solution at a steady, uniform rate which would have to be a maximum and thus much greater than actually needed during a considerable part of the time. It will be

2 understood that in addition to changes in volume or rate of flow, the character of sewage and thus its requirements for settling may vary quite widely, for example with sudden increases due to storm water, and also in a somewhat predictable manner which may repeat itself every twenty-four hours. Accordingly a further object of the present invention is to provide improved, simplified and reliable apparatus and procedure for producing chlorinated copperas solution and delivering it to a locality of use, a particular object being to provide such arrangements which are readily capable of control, in fact automatic control, in a manner consonant with requirements such as explained above.

The improvements herein described may be applied to the treatment of other materials, e. g. drinking water, water for swimming pools, industrial wastes and the like. The invention is of particular use in connection with apparatus for feeding chlorine for purification purposes; for example in some situations the addition of chlorine may cause variations in hydrogen ion concentrations which it may be desirable to counteract by the addition of a corrective chemical. Accordingly, another object of the invention is to provide apparatus by means of which the production of various mixtures, such as described above, and the rate of their supply, may be controlled manually or automatically as desired in accordance with changing conditions.

Another and more specific object is to provide improved methods and means for producing chlorinated copperas solution whereby the long retention periods heretofore employed in many cases with the view of insuring completeness of reaction between the ferrous sulfate solution and chlorine, may be very considerably reduced if not entirely eliminated. In that respect, it has now been found that a particularly speedy reaction between these materials may be obtained if they are fed from separate vacuum-feed devices by and to an injector, e. g. a suction type injector, of the nature of an aspirator in a line of aqueous fluid into which the mixture is thus desirably introduced; while the aqueous fluid in the injector may itself constitute the material to be treated, it will in most cases serve as a vehicle to carry the mixture to a much larger body of liquid, such as sewage in a main or in a settling tank. The described rapidity of action is believed to be occasioned by the peculiarly intimate mixing in the injector, which in some cases may have two restrictions or throats respectively serving for introduction of the two materials. In all such cases, by having the system totally enclosed there is no difficulty with fuming or corrosion once mixing has taken place in the injector.

By way of example, certain apparatus embodying the invention and illustratively serving to explain the principles and features of improvement, are shown in the annexed drawings and hereinbelow described.

Referring to the drawings:

Fig. 1 is a diagrammatic sectional elevation showing one form of the apparatus;

Fig. 2 is a similar view of another embodiment;

Fig. 3 is a diagrammatic fragmentary view illustrating a modified form of liquid feeding instrumentalities as applied to the system of Fig. 1; and Fig. 4 is a view like Fig. 3 but showing the last-mentioned, modified form incorporated in the system of Fig. 2.

The apparatus shown in Fig. 1 comprises a vacuum-feed device indicated generally at 11 for feeding ferrous sulfate solution, a vacuum-feed device indicated generally at 12 for feeding chlorine gas, an injector 13 for bringing about the discharges from the devices 11 and 12, and vacuum-adjusting means indicated generally at 14 for controlling the vacuum in the two devices. It may be explained that the apparatus indicated at 12, 13 and 14, except for certain modifications and connections hereinbelow described, constitutes a so-called vacuum type apparatus of known design, for feeding chlorine gas. In such apparatus the chlorine is advanced to an injector under a vacuum which may be produced by the latter and which is controlled by the device 14 for adjusting the rate of feed, the chlorine gas being drawn through a suitable flow resistance, viz. a so-called metering orifice, across which there is a drop in pressure to the controlled vacuum. The higher pressure on the upstream side of the orifice is usually kept constant, e. g. at a small negative value. References herein to a vacuum (or to a negative pressure) will be understood to mean a pressure below atmospheric and in most cases within a moderate range as generally employed in chlorine feeding equipment, such negative pressures being customarily measured in inches of water. It will also be understood that an increase of vacuum (or negative pressure) means a decrease in absolute pressure, and vice versa.

The liquid feeding apparatus indicated at 11 comprises an open tank 15 to which ferrous sulfate solution is fed as required along a main inlet pipe 16 and in which the solution is maintained at a constant level by a ball float valve 17. The tank has an overflow 18, e. g. for emergencies, and may also have suitable screens 18a to strain foreign particles from the solution and prevent clogging of the feeding devices. The end of the tank 15 remote from the inlet pipe 16 carries a vacuum chamber 19 which communicates with a chamber 21 of the vacuum adjusting means 14, for example by a pipe 20 which opens into each of the chambers at the top. The tank and the vacuum chamber 19 communicate through a passage 22 which includes a predeterminable flow resistance, such as an adjustable needle valve 23. Liquid may thus flow from the tank into the vacuum chamber and if the pressure in the chamber is atmospheric (as it is on the contents of the tank), liquid will rise in the chamber 19 to the same level as that maintained in the tank.

An outlet pipe 24 extends downwardly from the chamber 19, the opening of the pipe, within the chamber, being shaped to form an overflow weir 25 of shallow cylindrical configuration, and of substantially larger circumference than the pipe. At its lower end the pipe 24 extends into a liquid seal which comprises a tank 26 adapted to be supplied with water, continuously or otherwise as needed, through a pipe 27 and a ball float valve 28, so that a constant liquid level is maintained. An emergency overflow 29 is also provided in the tank. The pipe 24 has a length exceeding the greatest vacuum that can occur in the chamber 19 in use of the equipment, i. e. a length greater than the difference, as measured in the height of a corresponding water column, between the maximum negative pressure in the chamber 19 and the highest atmospheric (barometric) pressure contemplated in the vicinity.

A suction pipe 30 open to the liquid in the tank 26 leads to a throat 31 of the aspirator-type injector 13, the latter being supplied continuously with water from a suitable source such as the supply pipe 58 through a strainer 59, whereby the desired suction or vacuum is developed at the throat 31.

In the chlorine supply device 12, which may be of a known type, chlorine gas is introduced from a suitable source (not shown) through a pipe 32 into a water-sealed bell jar or like chamber 33, the incoming gas being delivered through a reducing valve 34 controlled by a ball float 35 arranged to provide a small negative pressure in the chamber. The bell jar itself is mounted in a water containing tray 36, in such fashion that water communicates freely between the exterior and interior of the bell jar, and the level of water in the tray is kept constant, as by the overflow described below. Water is introduced continuously to the tray from a supply pipe 37 through a strainer 38, controlling valve 39 and pipe 40. This supply of water, effected at a constant rate if desired, should be sufficient to maintain the intended levels in the tray and bell jar, and should also be enough to maintain such flow as is necessary in the arms of certain U-tube structure hereinbelow described, including such as is needed to operate an aspirator likewise mentioned below; but the water flow should be reasonably limited, e. g. to prevent departure of the pressure effects in the U-tube from correspondence with static conditions, as will be readily understood by those skilled in the art of vacuum feeding devices.

The injector 13 has another aspirator throat 41, which likewise provides a vacuum effect, and which is connected to a suction pipe 42 that opens upwardly into a suction chamber 43 at a locality above the bottom of the latter. At its upper part the chamber 43 communicates through a pipe 44 to the interior of the so-called metering tube 44a that extends upwardly in the bell jar above the water therein. The metering tube 44a communicates with the surrounding space in the jar through a predeterminable flow resistance constituted by an orifice 45, sometimes identified as a metering orifice. It will be understood that the vacuum communicated to the chamber 43 by the injector 13 tends to reduce the pressure in the interior of the bell jar, and the setting of the gas inlet valve 34, 35 is such that a vacuum is consequently maintained at a small constant value in the jar, i. e. a value indicated by $x$, the difference between the interior and exterior water levels. When the negative pressure in the chamber 43 is permitted to rise above this value, under the control described below, chlorine gas will be withdrawn through the orifice 45 at a rate determined by the amount of such excess vacuum.

An overflow pipe 46 for the tray 36 extends down from the level of water in the tray, to open into one end of a horizontal conduit 47 which may constitute the "bend" of a U-tube having upstanding arms 48, 49. The arm 49 of the U-tube opens into the lower part of the suction chamber 43, i. e. below the opening of the tube 42 and thus below the level of water therein, and the arm 48 opens into the lower part of the vacuum adjusting chamber 21, i. e. below its water level. The device 14 also includes an overflow pipe 50 leading down to open below the level of water in a collecting box 51 which has a weir 52 over which water may flow for discharge through a pipe 53. As will be hereinafter apparent, the vacuum in the chamber 21 is employed to control the feed of liquid from the chamber 19 and in the illustrated arrangement it is ordinarily desired that no liquid be fed unless chlorine is also supplied. Since no chlorine flows until the vacuum in the chamber 43 exceeds a value corresponding to the water height $x$, it is desirable to have no effective vacuum in the chamber 21 until that time; such relationship is readily obtained by disposing the top of the overflow pipe 50 below the top of the pipe 42 by an identical distance $x$.

The device 14 also includes an aspirator 54 comprising a relatively small tube 54a opening somewhat below the level of water in the chamber 21, but surrounded by a wall 54b having a small orifice 54c through which water flows into the space around the top of the tube 54a and down the tube under a small head. As will be understood by persons familiar with this aspirator structure, the parts are arranged and dimensioned so that successive bubbles of air or gas and slugs of water follow each other down the pipe 54a to the collecting box 51, thus tending to exhaust the air from the chamber 21. The overflow pipe 50 is sufficiently large so that air is not trapped or carried down it in such fashion, and the lower end of the pipe 54a opens sufficiently close to the level of water in the box 51 to permit effective release of the trapped bubbles. By virtue of this aspirator arrangement, a vacuum tends to build up in the chamber 21.

The device 14 may also include a well 55, freely communicating with the liquid in the chamber, and adapted to receive a vacuum limiting tube 56 which opens above the chamber to the atmosphere and is mounted for adjustment of its vertical position. Thus for a given adjustment of the tube 56, the maximum vacuum that may be developed in the chamber 21 is represented, in inches of water, by the distance between the open lower end of the tube 56 and the water level in the chamber.

While in some cases manual adjustment of the vacuum in the chamber 21 and thus of the rates of flow of chlorine and ferrous sulfate solution as hereinbelow explained may be effected simply by moving the pipe 56, a further connection as by a pipe 57 may be made to other vacuum control means. It will now be understood that the latter may be any of a variety of devices such as have been heretofore used or proposed for automatic or other control of vacuum-type gas feeding equipment, and since such further devices are per se no part of the present invention, none of them is here specifically illustrated.

For instance, one useful type of control device is a so-called differential converter as disclosed in U. S. Letters Patent No. 1,762,706, to Charles F. Wallace, granted June 10, 1930, and if the vacuum control line of the differential converter is connected to the pipe 57, the rate of feed of both reagents will be automatically adjusted in accordance with changes of flow of the liquid under treatment, e. g. sewage in the main (not shown) to which the injector 13 feeds. So-called rate controlling devices may also be employed, for example of the type wherein the vacuum is changed in accordance with a predetermined program to accord with expected diurnal variations of the demand of the sewage or like for treatment; simply by way of further example, a variety of vacuum controlling instrumentalities of that and other sorts capable of connection to the pipe 57 are disclosed in U. S. Letters Patent to John R. MacKay, Nos. 2,336,492 and 2,336,994, granted December 14, 1943. When so connected, the differential converter or other type of device just mentioned operates to reduce the vacuum in the chamber 21 from the limit set by the tube 56, to the desired operating value, for example by automatically introducing air in controlled amount to provide such relief of the excess vacuum. It will now be understood that in these and other ways the present apparatus is capable of any of a wide variety of types of automatic control, in accordance with flow or demand conditions.

In operation of the arrangement of Fig. 1, water flowing through the injector 13 to the main or other locality of treatment creates a negative pressure in the pipes 30 and 42. At the outset and assuming that there is no vacuum in the chamber 21, water is drawn through the pipe 30 to the injector throat 31 from the tank 26, and vacuum is produced in the chamber 43, but only equal to the value $x$ of the vacuum correspondingly produced under the bell jar 33. Since water is continuously supplied to the U-tube through the pipe 46, the flow of water up the tube 49 and into the chamber 43 not only maintains the level in this chamber at the top of the pipe 42, but the water also flows down the pipe 42 to the injector throat 41, to the extent necessary to relieve all but the minimum value of vacuum $x$ in the chamber.

Now further assuming that the tube 56 is set to permit a substantial vacuum in the chamber 21 and that such other control (not shown) as may be connected to the pipe 57 is adjusted to limit such vacuum to a selected specific value, the aspirator 54 functions to reduce the pressure in the chamber 21 and in fact promptly establishes a vacuum of the selected extent. It will be understood that continuous flow of water up through the pipe 48 is sufficient at all times to maintain operation of the aspirator and thus build up a vacuum of any desired extent, as limited by the controlling devices just mentioned.

As a result of such vacuum the level of water in the chamber 21 tends to rise and water (supplied from the pipe 48) consequently overflows down through the pipe 50 in greater quantity. Since the water level cannot actually rise appreciably above the top of the pipe 50 in the chamber 21 and since the vacuum there necessarily builds up to the controlled value, there is a corresponding increase of vacuum, i. e. a corresponding reduction of pressure in the chamber 43 at the other end of the U-tube. That is to say, to the extent that the vacuum in the chamber 43 might be less than that in the chamber 21 plus the initial value $x$, the U-tube functions with a tendency to reduce the level in the chamber 43, i. e. to provide less or no water for overflow into the pipe 42. In consequence the suction of the injector is permitted to increase the vacuum in the chamber 43 up to the point of balance for the U-tube 48, 47, 49, where the flow of water into the chamber 43 and down through the pipe 42 is again stabilized in a manner to prevent further increase of vacuum in the chamber 43. In consequence of such operations or their reverse, which occur upon any increase or decrease of pressure in the chamber 21, the pressure in the chamber 43 is maintained at a negative value exactly equal to that in the chamber 21, plus the amount indicated by $x$. Chlorine gas is therefore drawn through the orifice 45 by the resulting difference of pressure across it and is fed into the injector throat 41 in the usual manner for such feed devices.

At the same time the established vacuum in the chamber 21 is communicated through the pipe 20 to the chamber 19, tending to raise the liquid level above the edge of the weir 25. Liquid accordingly flows over the weir and down through the pipe 24 to the water seal 26, such liquid being the ferrous sulfate solution which it is desired to introduce with the chlorine in the stream traversing the injector. In further consequence, the liquid drawn through the pipe 30 now includes ferrous sulfate solution, to the extent that the latter is withdrawn through the pipe 24, and consequently in the desired proportion to the flow of chlorine into the injector. In the latter device the ferrous sulfate solution and chlorine are immediately mixed, and it is found that they react rapidly in the desired manner to provide the intended feed of chlorinated copperas into the nearby main or other body. It will be appreciated that the internal dimensions of the pipe 24 are preferably such that solution may pass through it under gravity to the tank, even at a maximum desired rate, without actually filling the pipe beyond a standing level indicated by the line 60, such level exceeding that in the box 26 by an amount equal to the vacuum in the chambers 21 and 19.

The proportions of ferrous sulfate solution and chlorine gas are determined by the setting of the needle valve 23, so that such proportions may be adjusted as desired, and will then remain substantially constant throughout a considerable variation in the rates of feed of the two reagents as such rates are simultaneously adjusted through the instrumentality of the control device 14. It will be noted that the chlorine supply device 12 provides a predetermined flow resistance such as the orifice 45 through which chlorine is advanced in accordance with a controlled difference of pressure, specifically by maintaining a constant pressure on the upstream side of the orifice and by adjusting the lower, negative pressure on the downstream side. At the same time, the flow of ferrous sulfate solution is effected through a predetermined flow resistance, such as the setting of the orifice provided by the valve 23, in accordance with a controlled pressure difference, the pressure at the upstream side of the orifice being maintained constant, by virtue of the constant liquid head in the tank 15, and the lower, negative pressure on the downstream side in the chamber 19 being adjusted by the device 21. Since the downstream pressures for both the orifices 23 and 45 are thus simultaneously controlled by the same instrumentality, and in fact by the same vacuum chamber, effective and substantially constant proportionality is maintained between the flow of chlorine gas and the flow of ferrous sulfate solution through a considerable range of adjustments.

Furthermore as explained above, by changing the value of one of the flow resistances, e. g. by adjusting the valve 23, the proportion may be changed to a desired extent. In consequence an effective and ready control is obtained of the chlorinated copperas solution developed in the injector line, both as to total rate of feed and as to proportion of the ingredients. It will be understood that although in the system illustrated in Fig. 1, the ferrous sulfate solution introduced through the pipe 30 may be more or less diluted with water from the box 26, e. g. to the extent that the potential vacuum produced by the injector throat 31 is not relieved by flow of solution originally contained in the tank 15, such dilution is immaterial in circumstances ordinarily contemplated, as where the product of the reagents in the injector is being fed to a very large body of sewage or other aqueous material.

Fig. 2 shows another arrangement, including a different form of vacuum controlling device, for the simultaneous feed of a plurality of reagents, such as chlorine gas and ferrous sulfate solution. As in the case of Fig. 1, there are provided a constant level tank 15, vacuum chamber 19, adjustable orifice valve 23 and associated instrumentalities for supply of ferrous sulfate solution in the manner described above, similar parts being identified by the same reference numerals. Instead of the particular devices 12, 13 and 14 illustrated in Fig. 1, there is provided a chlorine feeding device, constituting another type of vacuum control apparatus, specifically of the sort disclosed in U. S. Letters Patent No. 2,086,957 to Gerald D. Peet, granted July 13, 1937, reference being had, for instance, to Fig. 1 and other portions of the patent for features which are not per se a part of the present invention and which are therefore not here shown.

The vacuum control apparatus comprises parts enclosed in a housing 61, broken away to show certain parts more particularly related to the present improvements, together with a vacuum feed chamber resembling the device 12 of Fig. 1 and including a bell jar 62, tray 63, metering tube 64 and metering orifice 65, the latter parts 62 to 65 inclusive functioning in essentially the same manner as corresponding elements of Fig. 1 and also as described in the cited Peet patent. A constant negative pressure is maintained under the bell jar to an extent indicated by the difference of levels $x$ and chlorine gas is withdrawn through the orifice 65 into the metering tube 64 in accordance with the vacuum on the downstream side of the orifice. The apparatus includes an injector 67 which is of the aspirator type and which is adapted to withdraw gas and liquid through a pipe 68 from a suction chamber 70, the lower end of the metering tube 64 opening into the top of the suction chamber.

From the lower end of the suction chamber there extends one arm 71 of a U-tube which has another arm 72 and a bend 73 continuously receiving water by suitable means (not shown) as explained in the cited Peet patent. The U-tube arm 72 comprises a flexible tube opening into a control chamber 74 which is open to the atmosphere at 75 and includes a weir 76 separating the region above the entrance of the tube 72 from a like portion that opens downwardly into a flexible discharge tube 77. The suction chamber 74 is mounted for adjustment in vertical position, for example by being secured to a quadrant shaped structure 78 which can be turned as indicated by the arrows so as to move the chamber 74 from a zero position indicated by dotted lines 74a, through a range of positions representing different chlorine flows indicated on a scale 80.

It will now be seen that water from the U tube structure rises in the arms 71 and 72, filling the chamber 70 to a level such as shown and thence flowing to the asiprator 67, and also spilling over the weir 76 in the control chamber 75. Under these circumstances the vacuum in the suction chamber 70, as developed by the injector 67, cannot increase beyond an amount represented (in height of a water column) by the distance between the level in the chamber 70, i. e. its exit orifice 82, and the top of the weir 76. Thus the adjustment of the position of the control chamber 75 and its weir 76 effectively adjusts the vacuum in the chamber 70; at the position 74a, the vacuum is just enough to raise the level under the bell jar by the distance $x$ without actual flow of chlorine gas, and as the device 75 is moved to lower positions, the vacuum increases in the suction chamber 70, with corresponding increase of chlorine flow.

The vacuum chamber 19 of the ferrous sulfate feeding device 11 is connected by a pipe 84 to the upper part of the suction chamber 70, providing the corresponding vacuum in the chamber 19. The discharge pipe 24, through which falls the solution that overflows the weir 25, opens in a liquid seal box 85 that has an overflow pipe 86 and a discharge pipe 87 continuing as a U shaped trap 88 into communication with a pipe 90 which in turn opens into a lower part of the chamber 70.

Since in this embodiment of the invention the vacuum chamber 19 is connected directly with the same vacuum that is impressed on the downstream side of the metering orifice 65, it is desirable that there be no feed of ferrous sulfate solution unless the vacuum exceeds the small initial value $x$. Consequently the weir 25 is located at a place above the constant level 85a of liquid in the chamber 15, by a like distance $x$ as shown.

In order to insure proper functioning of vacuum control apparatus of the specific sort shown in Fig. 2 (including the open control chamber 74), an arrangement such as the U-tube trap 88 is conveniently provided, such trap extending further below the level in the suction chamber 70, than a distance equal, in height of water column, to the highest vacuum anticipated in the chamber 70 during operation of the equipment. Thus the standing liquid level 91 in the open arm of the trap 88 can be permitted to correspond, as it must, to the level of the top edge of the weir 76 at all adjusted positions of the latter, without falling into or below the bottom bend of the trap. It will be understood that the box 85, the trap 88 and the pipe 90 should be initially filled with water at the outset of operations, e. g. before and as a vacuum is first built up in the suction chamber 70.

In use, the apparatus of Fiig. 2 functions in a manner similar to that of Fig. 1, in that under the control of the vacuum communicated to the chamber 19, the ferrous sulfate solution overflows the weir 25 and passes down to the box 85, from which it is withdrawn to enter the injector with the chlorine. As explained hereinabove, the degree of vacuum in the suction chamber 70, and thus the rate of chlorine feed, is controlled by the positional adjustment of the chamber 74. This same degree of vacuum is communicated to the chamber 19, for correspondingly controlled withdrawal for the ferrous sulfate solution through the pipe 99, the suction applied to the pipe 90 being that of the chamber 70, as derived from the injector 67. Thus both the ferrous sulfate solution and the chlorine gas are fed in accordance with controlled pressure differences, specifically a controlled downstream pressure related in each instance to a constant upstream pressure, across corresponding predetermined orifices, with the result of substantial proportionality over a considerable range of rates of feed. The feeding rates of both reagents are simultaneously adjusted by the single means 74, and as in the case of Fig. 1, the proportion of ferrous sulfate to chlorine may be varied by changing the opening at the valve 23 in the solution feed device. Although mechanical, electrical or other automatic means may if desired be employed to adjust the quadrant element 78, as in response to changes of flow in the main or other vessel to which the injector discharge feeds, the apparatus of Fig. 2 can be readily controlled by hand, e. g. simply by moving the quadrant 78 to change the height of the weir 76.

In the apparatus of Fig. 3, which is shown connected with vacuum-type chlorine feeding apparatus of the sort illustrated in Fig. 1 and therefore only partly shown here, the constant level tank 15 is arranged to supply liquid to a vacuum chamber 100 through a connecting pipe 101. Whereas an adjustable valve or the like might be employed as shown in Figs. 1 and 2, the illustrated device includes instead (as might Figs. 1 or 2, if desired) a fixed orifice 102 in the path of communication, e. g. at the inlet end of the pipe 101, to provide the desired flow resistance and pressure drop. This fixed orifice member may be of predetermined calibration for a desired proportionality and may be arranged for removal and replacement by like elements of different sizes of opening, to afford adjustment of the relative rate of withdrawal of the ferrous sulfate solution. The chamber 100, at its lower part, communicates through a pipe 104 with one end of the so-called bend 47 of the U tube structure 48, 47, 49, while a pipe 105 extends from the throat 31 of the injector 13 into the upper part of the chamber 100, opening downwardly at the same level as that of the top of the overflow pipe 50 in the vacuum control chamber 21. In the arrangement shown, this level in the chamber 100 should also be the same as that constantly maintained in the supply tank 15, if there is to be a feed of solution as soon as a vacuum appears in the chamber 21. It will be understood that other instrumentalities not specifically mentioned, or not shown in Fig. 3, may be identical with those embodied in Fig. 1.

It will now be seen that the suction communicated to the chamber 100 from the aspirator throat 31 withdraws liquid continuously from this chamber, which is supplied with water from the U tube 47 through the line 104. If there is no vacuum in the chamber 21, the actual pressure in the chamber 100 will remain atmospheric; the suction of the injector throat will be fully relieved by water from the pipe 104 and there will be no difference of pressure across the orifice 102 to cause an appreciable flow of ferrous sulfate solution from the tank 15. However, to the extent that a negative pressure is established in the chamber 21, the U-tube connection of the chamber 100 therewith will prevent the absolute pressure in the latter from rising above such point, i. e. will require an equal negative pressure to be established, by the injector, in the chamber 100. Accordingly a difference of pressure is produced across the orifice 102, causing solution to pass from the tank 15 to the chamber 100 where it mixes into the water and is withdrawn through the pipe 105 to the injector, the rate of passage of solution through the orifice being thus determined by the extent of vacuum on the downstream side of the orifice. This vacuum is adjusted, as will now be apparent, by the device 14, which simultaneously controls the feed of chlorine as explained in connection with Fig. 1. With the levels in the several vessels of Fig. 3 maintained at the same vertical point, and with the control device 14 arranged to provide a vacuum only when a vacuum greater than $x$ (as in Fig. 1) is developed in the chlorine feed line, the ferrous sulfate solution will be fed when and only when there is a feed of chlorine—and by virtue of the control shown, only in substantially the desired proportion to the chlorine.

Fig. 4 shows the liquid feeding instrumentalities of Fig. 3 as embodied with vacuum control apparatus, for chlorine feed, of the sort illustrated in Fig. 2. Here the lower end of the vacuum chamber 100 is connected by a pipe 110 to the bend 73 of the U-tube in the chlorine supply device, and the pipe 112, which opens downwardly within the chamber 100, extends to the pipe 68 that in turn opens into the injector 67, the connection of the pipe 112 with the pipe 68 being effected, for example, at a point near the suction chamber 70. Ferrous sulfate solution, with water from the pipe 110, is withdrawn from the chamber 100 through the pipe 112, and the pressure in the chamber 100 is controlled, by its connection with the U-tube of the vacuum control apparatus, in accordance with the setting of the latter device. In order to insure that liquid will be properly carried over through the line 112 to the pipe 68 and thence to the injector, some pressure drop may be provided between the injector line 68 and the suction chamber 70, e. g. as by an orifice 114 where the pipe 68 communicates with the suction chamber. To prevent feed of ferrous sulfate solution until chlorine is actually being fed, the opening of the pipe 112 in the chamber 100 is disposed above the constant level in the tank 15 by a distance $x$ corresponding to the preliminary amount of vacuum that must exist before a flow of chlorine gas can occur.

It will now be seen that the arrangements of Figs. 3 and 4 provide a feed of ferrous sulfate solution and chlorine gas, or the like, substantially in a desired proportion and under a common vacuum control; each fluid is supplied through a predeterminable flow resistance with a constant pressure on the upstream side of the resistance and an adjusted pressure on the downstream side, and the downstream pressures are varied in unison.

In all embodiments, an effective and satisfactory feed of the desired reagents is provided under a common control of feeding rate, which may conform to a wide variety of requirements. Satisfactory and peculiarly rapid reaction of the ingredients is also achieved and at the same time their mutual proportions can be readily adjusted, in a manner independent of the rate of feed.

It is to be understood that the invention is not limited to the specific steps and embodiments herein shown and described, but may be carried out in other ways without departure from its spirit as defined by the following claims.

I claim:

1. In fluid feeding apparatus, in combination: vacuum-type gas feeding apparatus which comprises liquid-containing means for receiving gas, said liquid-containing means comprising an enclosed passage through which the said contained liquid flows, filling the passage, and gas receiving means for injecting gas into said passage, said gas feeding apparatus also comprising means for feeding a continuous flow of gas to said liquid-containing means under a continuously maintained pressure drop to a vacuum and at a rate governed solely by the value of said vacuum, and vacuum control means for controlling the vacuum at a selected value to maintain a desired rate of gas feed; a liquid supply vessel having an outlet and means for maintaining a predetermined head in the liquid at said outlet, said last-mentioned means comprising means for maintaining the vessel filled with liquid to a predetermined level above said outlet and said outlet being disposed and wholly submerged below said predetermined level, a liquid-receiving vacuum chamber having a connection to receive liquid from said outlet, said vacuum chamber having means to maintain a predetermined liquid level therein and said connection from the aforesaid outlet being disposed to open in said chamber at a locality wholly below the level of liquid in the chamber, flow resistance means in said connection between the vessel and the chamber so that liquid will flow continuously from the vessel to the chamber at a rate governed solely by the amount by which pressure downstream of said flow resistance means departs from said predetermined head, and means connecting said chamber with the gas feeding apparatus, for directing liquid continuously from the chamber, under suction of the vacuum therein, to the liquid-containing means and for control of the vacuum in the chamber by the aforesaid vacuum control means, said last-mentioned means including conduit structure providing fluid communication between the chamber and the vacuum control means, to maintain the pressure of the liquid in the chamber continuously at a value selected by the vacuum control means and corresponding to the aforesaid selected value of vacuum.

2. The apparatus of claim 1 wherein the flow resistance means comprises an adjustable orifice, for effecting variation in the proportion of liquid to gas as fed to the liquid-containing means.

3. The apparatus of claim 1 wherein the last-mentioned connecting means includes a conduit opening within the chamber and adapted to extend to the liquid-contaning means, said conduit having an associated weir in the chamber, over which liquid flows into the conduit, and said weir having a horizontal extent substantially greater than the circumference of the conduit.

4. The apparatus of claim 1 wherein the liquid-containing means of the feeding apparatus comprises a suction device and the aforesaid conduit structure communicating with the vacuum control means comprises hydraulic pressure-transmitting means, and wherein the connecting means comprises a suction conduit adapted to extend to the suction device and depending into the chamber for withdrawing liquid therefrom, the aforesaid conduit structure being disposed to open into the chamber below the liquid therein, for control of the pressure in the liquid in the chamber by the vacuum control means.

5. A method of producing a predetermined solution at a controllably variable rate, said solution being derived from a gas and a liquid comprising advancing the gas and the liquid separately and continuously through flow-resistances, each under a continuously maintained vacuum downstream of the resistance, to a mixing locality, the pressure of each fluid being maintained constant upstream of the corresponding resistance so that the rate of flow of each fluid is directly and continuously governed by the value of vacuum downstream of the resistance, and maintaining the proportions of said gas and liquid substantially at a desired value by controlling the vacuum for feed of each from a common source of vacuum and varying the rate of production of said predetermined solution by varying the vacuum of said common source.

6. A method of producing chlorinated copperas solution, comprising withdrawing chlorine and ferrous sulfate solution separately from supplies thereof, and while simultaneously controlling the flow of each to maintain substantially a desired proportionality between them, establishing suction conditions in a flowing aqueous stream by restricting the flow of said stream, and directing the chlorine and ferrous sulfate solution into said stream under said suction, for mixing of said chlorine and ferrous sulfate together at least substantially immediately upon their incorporation in said stream, said ferrous sulfate solution and chlorine being withdrawn from the supply thereof under and in accordance with a pressure drop to a vacuum, and said flow controlling step comprising establishing an adjustable control vacuum and converting changes in said control vacuum into simultaneous changes in the aforesaid pressure drops to maintain the proportionality.

7. Apparatus for feeding liquid at a desired rate of flow, comprising a liquid supply tank for holding liquid at atmospheric pressure over the liquid, an outlet therefrom, means for introducing liquid to the tank, said tank having level-responsive means adapted to cooperate with the liquid-introducing means, for maintaining the liquid in the tank continuously at a predetermined level, and said outlet being disposed below said level, a closed chamber communicating with said outlet at a predetermined low locality of said chamber, plural conduit means communicating with said chamber and having suction-applying means connected with one of the conduits thereof for maintaining the interior of the chamber continuously at sub-atmospheric pressure, said plural conduit means including a liquid withdrawing conduit and a pressure control conduit both opening into the chamber, said liquid-withdrawing conduit opening in the chamber at a predetermined level between the top and bottom thereof, said chamber being disposed relative to the aforesaid outlet and tank so that liquid may rise in the chamber to said last-mentioned predetermined level at a predetermined maximum pressure in the chamber, said predetermined maximum pressure being at least as low as atmospheric, and said liquid-withdrawing conduit being adapted to withdraw all liquid which tends to rise above said level in the chamber, and an adjustable pressure control device connected to said pressure control conduit for maintaining the pressure in the chamber continuously at a selected sub-atmospheric value which is below said predetermined maximum, said outlet including a predetermined liquid flow resistance between the tank and the chamber, so that liquid flows continuously from the tank to the chamber at a rate which is governed solely by the pressure difference between said selected value and said predetermined maximum and which can therefore be adjusted by adjustment of said selected value alone.

8. An apparatus for use in feeding a liquid at a desired rate of flow which may be variable, comprising a liquid supply tank having a liquid inlet connection and means for continuously maintaining liquid in the tank at a constant level with the space above the liquid at atmospheric pressure, a closed chamber alongside the tank into which the liquid can flow from the tank to assume the same level when the pressure in the chamber is atmospheric, passage means connecting the tank and the chamber between localities of each below said level to permit continuous flow of liquid, a liquid-discharge pipe having its inlet end opening at a predetermined level in the chamber not lower than the aforesaid level and leading down from the interior of the chamber for removal of liquid by overflow into said pipe, a liquid seal closing the lower end of said pipe to the atmosphere while permitting discharge of liquid therethrough, and means for connecting the space above the liquid in the chamber to a source of reduced pressure, including means for adjusting the reduced pressure thus communicated to the chamber, said passage means including a predetermined flow resistance, so that the liquid will be caused to flow continuously from the tank to the chamber and to overflow continuously into the discharge pipe by the pressure difference set up by the reduction in pressure in the chamber, and at a rate governed by the adjusted value of said reduced pressure.

9. An apparatus as described in claim 8 in which the inlet end of the discharge pipe comprises an overflow weir of larger diameter than the pipe so that a considerable quantity of liquid will overflow the weir upon a slight reduction of the pressure in the chamber.

10. Apparatus as described in claim 8, wherein the predetermined flow resistance comprises an adjustable orifice for adjusting the predetermined flow resisting-value of said flow resistance, for varying the rate of flow of the liquid from the tank to the chamber independently of adjustment of said reduced pressure in the chamber.

11. Apparatus for producing a mixture of two fluids in substantially fixed proportions but at varying rates of flow, comprising a supply vessel for one fluid, a closed receiving vessel consisting of an enclosed, controlled-pressure chamber, passage means between the vessels, including a predetermined flow resistance, for continuous passage of fluid from the supply vessel to the receiving vessel through said resistance, said passage means providing direct communication of the vessels with the resistance so that the fluid pressures on opposite sides of the resistance are respectively the pressures of said first fluid in the respective vessels, means in the supply vessel for continuously maintaining a constant predetermined pressure of said fluid upstream of said resistance, a second supply vessel for the other fluid, a second closed receiving vessel consisting of a second enclosed, controlled-pressure chamber, passage means between said second vessels, including a second predetermined flow resistance, for continuous passage of fluid from the second supply vessel to the second receiving vessel through said second resistance, said second passage means providing direct communication of the said second vessels with the said second resistance so that the fluid pressures on opposite sides of the said second resistances are respectively the pressures of said second fluid in the respective second vessels, means in the said second supply vessel for continuously maintaining a constant predetermined pressure of said second fluid upstream of said second resistance, means providing a mixing locality and having connections for withdrawing the fluids from said first and second receiving vessels to said mixing locality, means continuously applying suction to said first and second receiving vessels, to provide a lower pressure in each fluid downstream of the corresponding resistance than the constant pressure upstream thereof, each of said fluids being thereby continuously advanced through the corresponding passage means at a rate governed directly in accordance with the pressure downstream of the resistance, and a common, adjustable vacuum controlling device having connections providing fluid communication with both said first and second receiving vessels, for simultaneously controlling the pressures in the receiving vessels respectively, to maintain a constant proportionality beetween the pressures in the first and second fluids downstream of the respective flow resistances over a predetermined range of adjustment of said vacuum control device in correspondence with a range of desired rates of flow of said fluids.

12. Apparatus as described in claim 11, wherein the first one of the fluids is a gas and the first supply vessel comprises a closed vessel from which the gas flows through the first passage means to the first receiving vessel, and wherein the second fluid is a liquid, and the second supply vessel comprises a tank for holding said liquid under atmospheric pressure, the means in said second supply vessel for maintaining a constant pressure upstream of the corresponding flow resistance comprising means maintaining a constant level of liquid in said tank at atmospheric pressure over the liquid.

13. Apparatus as described in claim 12, wherein the second predetermined flow resistance, between the liquid tank and the second receiving vessel comprises an adjustable orifice for adjusting the predetermined flow-resisting value of said flow resistance, to provide variation in the proportionality of flow between the liquid and the gas.

ERNEST ARTHUR WHITLOCK.

REFERENCES CITED

The following references are of record in the file of this patent:

UNITED STATES PATENTS

| Number | Name | Date |
| --- | --- | --- |
| 1,734,196 | Blumenberg | Nov. 5, 1929 |
| 1,762,706 | Wallace | June 10, 1930 |
| 2,081,794 | De Echagaray | May 25, 1937 |
| 2,086,957 | Peet | July 13, 1937 |
| 2,090,069 | Richardson et al. | Aug. 17, 1937 |
| 2,137,361 | Slagle | Nov. 22, 1938 |
| 2,207,761 | Sayles | July 16, 1940 |
| 2,362,606 | Albertson et al. | Nov. 14, 1944 |

FOREIGN PATENTS

| Number | Country | Date |
| --- | --- | --- |
| 141,330 | Switzerland | Oct. 1, 1930 |